US012789782B2

(12) United States Patent
Kawazoe et al.

(10) Patent No.: US 12,789,782 B2
(45) Date of Patent: Nov. 10, 2026

(54) VEHICLE CONTROL METHOD AND VEHICLE CONTROL DEVICE

(71) Applicant: NISSAN MOTOR CO., LTD., Yokohama (JP)

(72) Inventors: Kento Kawazoe, Kanagawa (JP); Fumiaki Hioki, Kanagawa (JP); Hiroaki Suguro, Kanagawa (JP); Shumpei Mishima, Kanagawa (JP); Tomohisa Hirano, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 224 days.

(21) Appl. No.: 18/268,835

(22) PCT Filed: Dec. 22, 2020

(86) PCT No.: PCT/JP2020/047786
§ 371 (c)(1),
(2) Date: Jun. 21, 2023

(87) PCT Pub. No.: WO2022/137308
PCT Pub. Date: Jun. 30, 2022

(65) Prior Publication Data
US 2024/0059271 A1 Feb. 22, 2024

(51) Int. Cl.
*B60W 10/26* (2006.01)
*B60W 10/02* (2006.01)
(Continued)

(52) U.S. Cl.
CPC .......... *B60W 10/26* (2013.01); *B60W 10/026* (2013.01); *B60W 10/30* (2013.01);
(Continued)

(58) Field of Classification Search
CPC .... B60W 10/26; B60W 10/026; B60W 10/30; B60W 30/18109; B60W 2510/18;
(Continued)

(56) References Cited

U.S. PATENT DOCUMENTS

2006/0131085 A1* 6/2006 Tamai .................. B60W 20/00
180/65.26
2013/0040778 A1* 2/2013 Schulte ........... B60W 30/18072
180/65.265
(Continued)

FOREIGN PATENT DOCUMENTS

JP 2015009629 A * 1/2015
WO WO-2018/189897 A1 10/2018

*Primary Examiner* — Aniss Chad
*Assistant Examiner* — Christine Nguyen Huynh
(74) *Attorney, Agent, or Firm* — Foley & Lardner LLP

(57) ABSTRACT

A control unit (21) causes release of a lockup clutch (3*a*) when a speed of a vehicle reaches a first vehicle speed value (V1), which is set according to a deceleration rate of the vehicle, during deceleration running of the vehicle. Further, the control unit (21) stops regenerative power generation of an alternator (11) when the speed of the vehicle reaches a second vehicle speed value (V2), which is varied according to the deceleration rate of the vehicle, during the deceleration running of the vehicle. By this control, the stop timing of the regenerative power generation of the alternator (11) during the deceleration running is set in accordance with the deceleration rate of the vehicle whereby the vehicle achieves both of fuel consumption performance and driving performance.

7 Claims, 4 Drawing Sheets

(51) Int. Cl.
*B60W 10/30* (2006.01)
*B60W 30/18* (2012.01)

(52) U.S. Cl.
CPC ... *B60W 30/18109* (2013.01); *B60W 2510/18* (2013.01); *B60W 2510/305* (2013.01); *B60W 2520/10* (2013.01); *B60W 2710/024* (2013.01); *B60W 2720/106* (2013.01)

(58) Field of Classification Search
CPC ....... B60W 2510/305; B60W 2520/10; B60W 2710/024; B60W 2720/106; B60W 2520/105; B60W 30/18127; B60W 10/08; B60L 7/00; B60L 50/10
See application file for complete search history.

(56) References Cited

U.S. PATENT DOCUMENTS

2015/0203106 A1* 7/2015 Zhao ..................... B60W 20/50
701/22
2017/0361833 A1* 12/2017 Matsubara ........... B60W 10/115

* cited by examiner

VEHICLE CONTROL METHOD AND VEHICLE CONTROL DEVICE

TECHNICAL FIELD

The present invention relates to a control method of a vehicle and a control device of a vehicle.

BACKGROUND ART

Patent Document 1 discloses a technique for executing coasting regeneration control to control a motor/generator to apply a regenerative torque during deceleration running of a vehicle. In the technique of Patent Document 1, the coasting regenerative force is set to "0" when the vehicle speed is lowered to a coasting end speed during the execution of the coasting regeneration control.

In some cases, the vehicle allows engagement of a lockup clutch for fuel cut in conjunction with the execution of regenerative power generation during deceleration running. The vehicle allows release of the engaged lockup clutch when the vehicle speed reaches a given vehicle speed value that is set according to a deceleration rate of the vehicle. This raises the possibility that, depending on the deceleration rate of the vehicle, the timing of stop of the regenerative power generation and the timing of release of the lockup clutch overlap each other to cause a deterioration of driving performance due to a sudden loss of deceleration feeling.

Accordingly, there is room for improvement in the execution of regenerative power generation during deceleration running of the vehicle for the purpose of achieving both of driving performance and fuel consumption performance.

PRIOR ART DOCUMENTS

Patent Documents

Patent Document 1: PCT International Application Publication No. 2018/189897

SUMMARY OF THE INVENTION

The present invention is directed to control of a vehicle, wherein the control includes, during deceleration running of the vehicle, releasing a lockup clutch when the vehicle speed reaches a first vehicle speed value that is set according to a deceleration rate of the vehicle, and stopping regenerative power generation of an alternator when the vehicle speed reaches a second vehicle speed value that is different from the first vehicle speed value.

According to the present invention, the vehicle achieves both of driving performance and fuel consumption performance.

DESCRIPTION OF EMBODIMENTS

Hereinafter, one embodiment of the present invention will be described in detail below with reference to the drawings.

Figure 1:
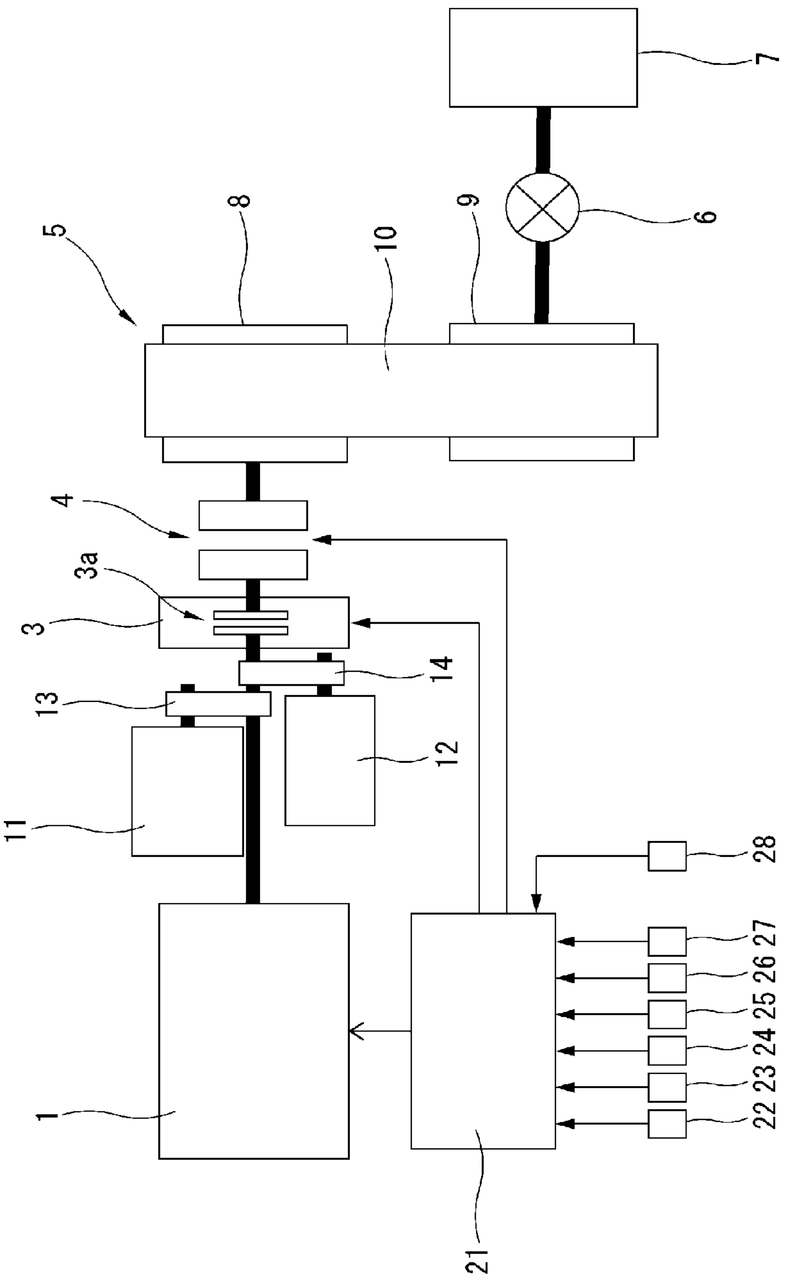
FIG. 1 is a schematic system configuration diagram of a vehicle to which the present invention is applicable.

FIG. 1 is a schematic system configuration view of a vehicle in which the present invention is embodied.

An internal combustion engine 1 is, for example, a multi-cylinder spark ignition gasoline engine, and is mounted to the vehicle such as automotive vehicle. The internal combustion engine 1 is equipped with a fuel injection valve (not shown). The fuel injection amount and timing of the fuel injection valve and the pressure of fuel supplied to the fuel injection valve are optimally controlled by the after-mentioned control unit 21.

A driving power of the internal combustion engine 1 is transmitted to a transmission such as CVT (continuously variable transmission) 5 via a torque converter 3 and a forward clutch 4. The driving power is further transmitted from the CVT 5 to driving wheels 7 of the vehicle via a final gear unit 6.

In other words, the internal combustion engine 1 is configured to output and transmit rotation of a crankshaft (not shown) as the driving power to the driving wheels 7 of the vehicle.

Although not specifically shown in the figure, the torque converter 3 has a pump impeller and a turbine runner. The torque converter 3 also has a mechanical lockup clutch 3*a* for connection and disconnection of the pump impeller and the turbine runner. The engagement and release of the lockup clutch 3*a* are controlled according to various operating conditions such as vehicle speed, accelerator pedal opening and the like. For example, the lockup clutch 3 is released at the time of start-up acceleration of the vehicle. The lockup clutch 3*a* is engaged during steady running or deceleration running of the vehicle.

The forward clutch 4 is disposed between the torque converter 3 and the CVT 5, and is engaged for allowing transmission of the driving torque from the internal combustion engine 1 to the driving wheels 7. In other words, the forward clutch 4 is arranged on a power transmission path for transmission of the driving power of the internal combustion engine 1 to the driving wheels 7.

Herein, the engagement/release operations of the lockup clutch 3 and the forward clutch 4 are performed according to control commands from the after-mentioned control unit 21.

The CVT 5 has an input-side primary pulley 8, an output-side secondary pulley 9 and a belt 10 for transmitting rotation of the primary pulley 8 to the secondary pulley 9.

The CVT 5 is configured to continuously vary its transmission ratio by e.g. hydraulically changing the widths of V-grooves (not shown) of the primary and secondary pulleys 8 and 9 around which the belt 10 is wound and thereby changing the radius of contact between the belt 10 and the primary and secondary pulleys 8 and 9.

Although the CVT 5 is used as the transmission in the present embodiment, a stepped automatic transmission can be used in place of the CVT 5. In such a case, it is feasible to constitute the forward clutch 4 by diverting a plurality of frictional engagement elements in the stepped automatic transmission.

Further, the internal combustion engine 1 is configured to drive an alternator 11 that generates power for charging a vehicle-mounted battery (not shown), a compressor 12 of an air conditioner, and the like.

The alternator 11 and the compressor 12 are disposed at positions closer to the internal combustion engine 1 than the torque converter 3 so as to be drivable by the internal combustion engine 1.

A rotational power on the above-mentioned power transmission path is transferable to the alternator 11 and the compressor 12. In the present embodiment, rotation from the internal combustion engine 1 or the driving wheels 7 is transferred to the alternator 11 via a belt 13; and rotation from the internal combustion engine 1 or the driving wheels 7 is transferred to the compressor 12 via a belt 14.

In the case of driving the auxiliary equipment such as alternator 11, compressor 12 etc. upon occurrence of an auxiliary equipment driving demand, the internal combustion engine 1 bears the auxiliary equipment load. This leads to an increase in the load of the internal combustion engine 1.

To the control unit 21, there are inputted detection signals from various sensors. Herein, the various sensors include: a crank angle sensor 22 that detects a crank angle of the crankshaft; an accelerator opening sensor 23 that detects a depression amount of a accelerator pedal (not shown) of the vehicle; a vehicle speed sensor 24 that detects a running speed of the vehicle; an acceleration sensor 25 that detects an acceleration rate of the vehicle; a brake sensor (brake switch) 27 that detects a depression amount of a brake pedal (not shown) of the vehicle; an air conditioner sensor (air conditioner switch) 27 that detects an ON/OFF state of the air conditioner; and a refrigerant pressure sensor 28 that detects a refrigerant pressure of the air conditioner.

The control unit 21 is in the form of a known type of digital computer equipped with a CPU, a ROM, a RAM and an input/output interface.

The control unit 21 is configured to allow regenerative power generation of the alternator 11 with engagement of the lockup clutch 3*a* during deceleration running of the vehicle.

The crank angle sensor 22 is of the type capable of detecting the rotation speed of the internal combustion engine 1 (engine rotation speed). The acceleration sensor 25 is of the type capable of detecting the deceleration rate of the vehicle.

Figure 2:
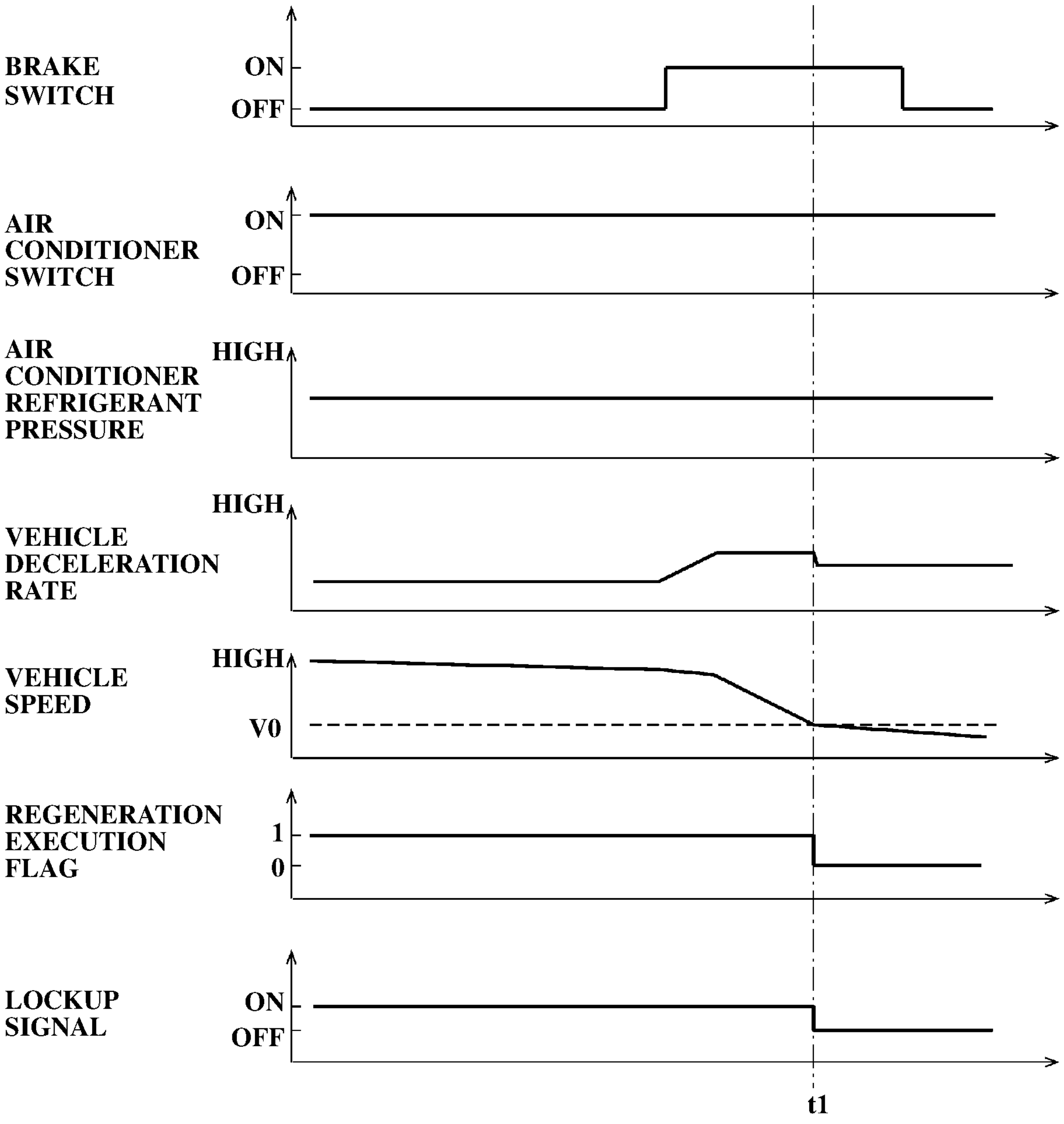
FIG. 2 is a timing chart of operation at the time of stop of regenerative power generation in one comparative example.

FIG. 2 is a timing chart of operation at the time of stop of regenerative power generation in one comparative example. In the comparative example of FIG. 2, the regenerative power generation of the alternator 11 is stopped when the running speed of the vehicle (referred to as vehicle speed) becomes lower than or equal to a given speed threshold value V0 during deceleration running of the vehicle. This speed threshold value is a predetermined constant value (fixed value).

In the comparative example of FIG. 2, the vehicle speed becomes lower than or equal to the speed threshold value V0 at time t1.

At time t1, the regeneration execution flag is switched from "1" to "0" in the comparative example of FIG. 2. When the regeneration execution flag is "1", the alternator 11 executes regenerative power generation. When the regenerative power generation flag is "0", the alternator 11 does not execute regenerative power generation. Thus, the regenerative power generation of the alternator 11 is stopped at the time when the regeneration execution flag is switched from "1" to "0", and is started at the time when the regeneration execution flag is switched from "0" to "1".

In the comparative example of FIG. 2, the lockup clutch 3*a* is released when the vehicle speed reaches a given speed threshold value that is set according to the deceleration rate of the vehicle. At time t1, the lockup clutch 3*a* is released as the vehicle speed reaches the given speed threshold value. Further, the lockup signal is switched from "ON" to "OFF" at time t1. The clutch 4 is engaged when the lockup signal is "ON", and is engaged when the lockup signal is "OFF".

In the case where the regenerative power generation of the alternator 11 is stopped when the vehicle speed becomes lower than or equal to the predetermined constant speed threshold value V0, the stop timing of the regenerative power generation of the alternator 11 and the release timing of the lockup clutch 3*a* may overlap each other, as shown in FIG. 2, depending on the deceleration rate of the vehicle. Such timing overlap causes a sudden loss of deceleration feeling, which results in a deterioration of driving performance.

Consequently, there is a possibility that it becomes difficult for the vehicle to achieve both of fuel consumption efficiency and driving performance in the comparative example of FIG. 2.

The control unit 21 of the preset embodiment is hence configured to: cause release of the lockup clutch 3*a* when the vehicle speed becomes lower than or equal to a first speed threshold value V1 during deceleration running of the vehicle; and stop regenerative power generation of the alternator 11 when the vehicle speed becomes lower than or equal to a second speed threshold value V2, which is different from the first speed threshold value V1, during deceleration running of the vehicle. (The first speed threshold value V1 and the second speed threshold value V2 are different from each other at all times regardless of conditions.) The first speed threshold value V1 corresponds to a first vehicle speed value, and varies according to the deceleration rate of the vehicle. The second speed threshold value V2 corresponds to a second vehicle speed value, and varies according to the deceleration rate of the vehicle.

In other words, the control unit 21 serves as a controller to: cause release of the lockup clutch 3*a* when the vehicle speed reaches the first speed threshold value V1 during the deceleration running of the vehicle; and stop regenerative power generation of the alternator 11 when the vehicle speed reaches the second speed threshold value V2 during the deceleration running of the vehicle.

The above-mentioned control of the present embodiment enables, during deceleration running of the vehicle, setting the stop timing of the regenerative power generation of the alternator 11 in accordance with the deceleration rate of the vehicle so that the vehicle achieves both of fuel consumption performance and driving performance.

When the deceleration rate is low, the second speed threshold value V2 can be set low for fuel efficiency improvement effect. When the deceleration rate is high, the second speed threshold value V2 can be set higher than the first speed threshold value V1 that is set high to prevent stalling of the engine (called engine stalling).

The first speed threshold value V1 or the second speed threshold value V2 is set higher as the deceleration rate of the vehicle becomes higher.

This allows, when the deceleration rate is high, the first speed threshold value V1 or the second speed threshold value V2 to be set high so as to prevent stalling of the engine (engine stalling).

Both of the first speed threshold value V1 and the second speed threshold value V2 may be set higher as the deceleration rate of the vehicle becomes higher.

Figure 3:
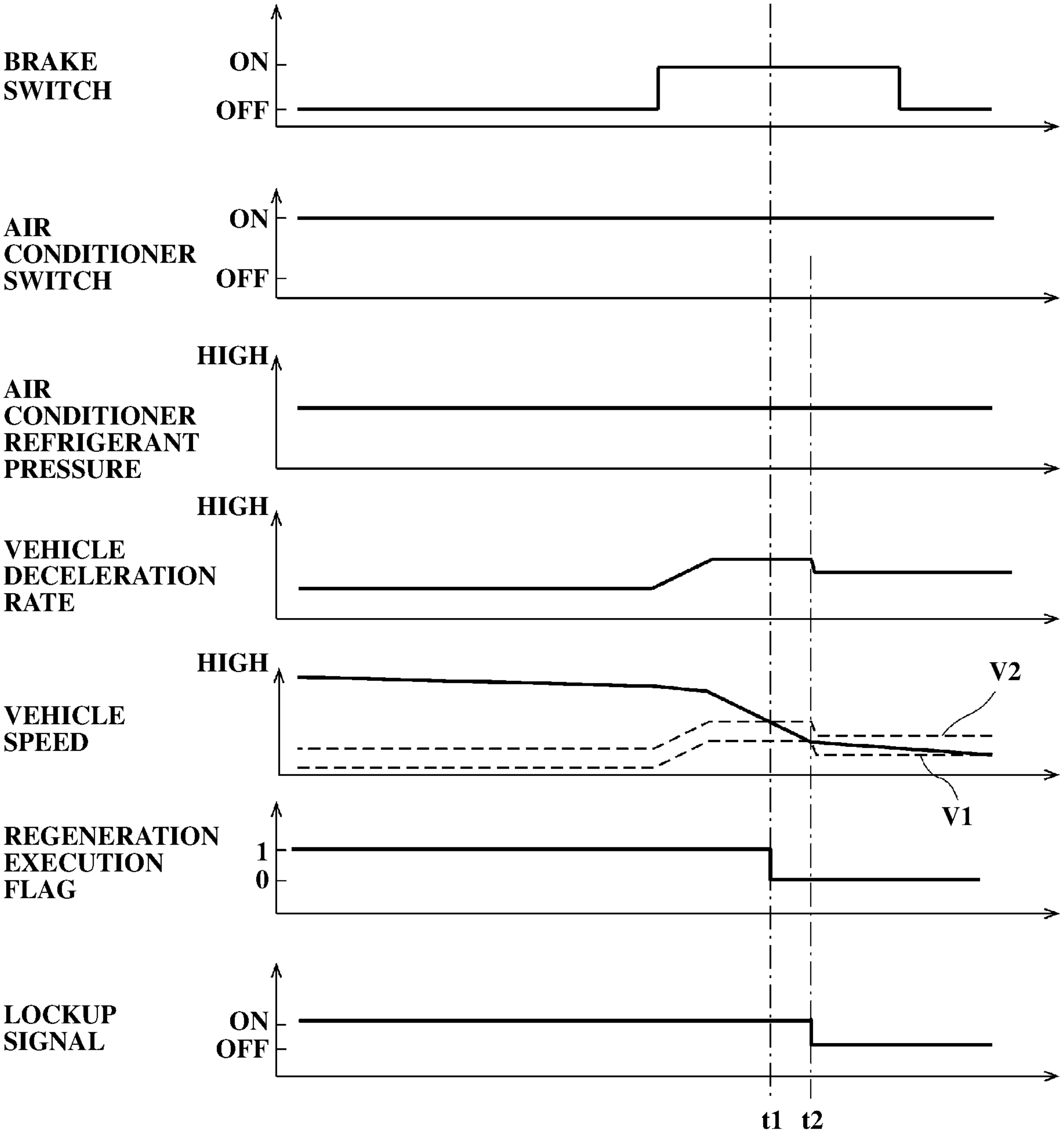
FIG. 3 is a timing chart of operation in one embodiment of the present invention where first and second speed threshold values V1 and V2 are set according to a deceleration rate of the vehicle.

FIG. 3 is a timing chart of one example of operation under the control of the present embodiment where the first and second speed threshold values V1 and V2 are each set according to the deceleration rate of the vehicle.

The first speed threshold value V1 indicated by broken line in FIG. 3 and the second speed threshold value V2 indicated by broken line in FIG. 3 are set different from each other. That is to say, under the same deceleration rate, the first and second speed threshold values V1 and V2 are set to different values.

In the embodiment example of FIG. 3, the vehicle speed indicated by solid line in FIG. 3 becomes lower than or equal to the second speed threshold value V2 at time t1. The regeneration execution flag is then switched from "1" to "0" at time t1.

Further, the vehicle speed indicated by solid line in FIG. 3 becomes lower than or equal to the first speed threshold value V1 at time t2 in the embodiment example of FIG. 3. The lockup signal is then switched from "ON" to "OFF" at time t2. The threshold for switching the lockup signal from "OFF" to "ON" is set to a higher value than the first speed threshold value V1. The lockup signal is thus maintained in the "OFF" state after time t2 in the embodiment example of FIG. 3.

The control unit 21 may be configured to stop the regenerative power generation of the alternator 11 at a timing earlier than the release of the lockup clutch 3*a*. In other words, the first speed threshold value V1 may be set lower than the second speed threshold value V2.

In this case, the regenerative power generation of the alternator 11 is stopped before the release of the lockup clutch 3*a* during the deceleration running of the vehicle. Since the stop timing of the regenerative power generation of the alternator 11 and the release timing of the lockup clutch 3*a* are prevented from overlapping each other, a deterioration of driving performance is suppressed.

The control unit 21 may alternatively be configured to release the lockup clutch 3*a* at a timing earlier than the stop of the regenerative power generation of the alternator 11. In other words, the first speed threshold value V1 may be set higher than the second speed threshold value V2.

In this case, the second speed threshold value V2 as the threshold for stopping the regenerative power generation of the alternator 11 is set low for fuel efficiency improvement when the deceleration rate of the vehicle is low (that is, the vehicle is under slow deceleration).

The first speed threshold value V1 and the second speed threshold value V2 may be set higher as the refrigerant pressure of the air conditioner becomes higher. The higher the refrigerant pressure of the air conditioner, the higher the load of the internal combustion engine 1.

By this threshold setting, the internal combustion engine 1 is prevented from stalling during the deceleration running.

The first speed threshold value V1 and the second speed threshold value V2 in a brake-on state may be set different from those in a brake-off state.

Since the deceleration rate of the vehicle can be changed according to driver's intention in the brake-on state, the vehicle is able to ensure driving performance without causing a feeling of discomfort to the driver even when the first and second speed threshold values V1 and V2 in the brake-on state are set lower than those in the brake-off state.

Hence, the vehicle ensures driving performance by setting the first and second speed threshold values V1 and V2 in the brake-off state higher than those in the brake-on state and thereby controlling the vehicle in such a manner as to decrease the amount of change of the deceleration rate and not give a discomfort feeling to the driver.

Figure 4:
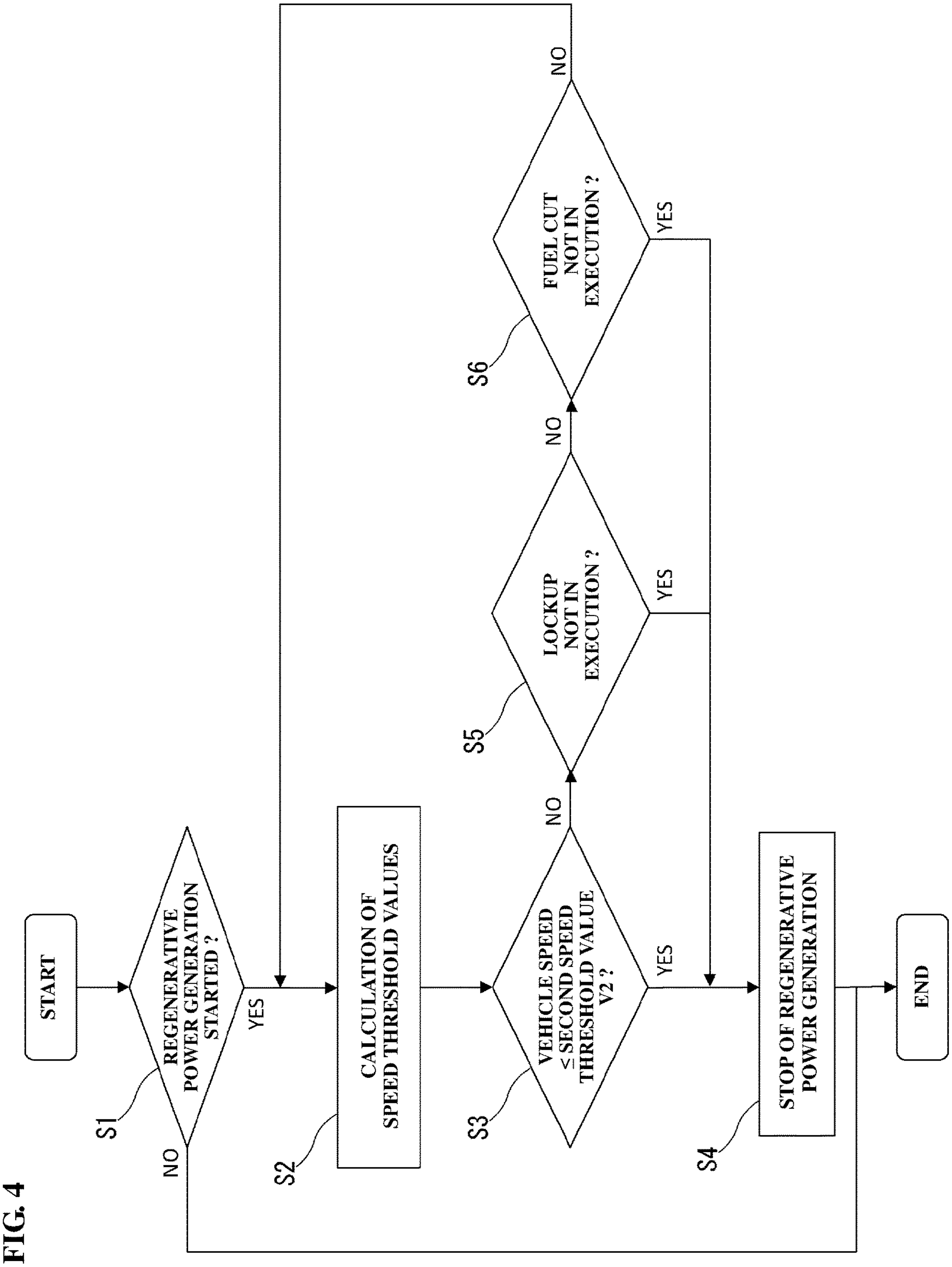
FIG. 4 is a flowchart for control of the vehicle during deceleration running in one embodiment of the present invention.

FIG. 4 is a flowchart of one example of the control during the deceleration running of the vehicle.

In step S1, it is judged whether or not to execute regenerative power generation of the alternator 11 with engagement of the lockup clutch 3*a*. The regenerative power generation of the alternator 11 is executed upon satisfaction of regenerative power generation executing conditions such as those where the accelerator pedal is not depressed, the battery SOC of the vehicle-mounted battery is higher than a given battery threshold value, and the like. When it is judged in step S1 that the regenerative power generation is executed, the control proceeds to step S2. When it is judged in step S1 that the regenerative power generation is not executed, the control exits from the current routine.

In step S2, the first speed threshold value V1 and the second speed threshold value V2 are each determined according to the deceleration rate of the vehicle. For example, it is feasible to determine the first and second threshold values V1 and V2 by previously storing in the control unit 21 a map correlating the deceleration rate with the speed threshold values.

In step S3, it is judged whether the vehicle speed is lower than or equal to the second speed threshold value V2. When it is judged in step S3 that the vehicle speed is lower than or equal to the second speed threshold value V2, the control proceeds from step S3 to step S4. When it is judged in step S3 that the vehicle speed is not lower than or equal to the second speed threshold value V2, the control proceeds from step S3 to step S5.

In step S4, the regenerative power generation of the alternator 4 is stopped.

In step S5, it is judged whether the lockup operation is in execution, that is, whether the lockup clutch 3*a* is in the engaged state. When it is judged in step S5 that the lockup clutch 3*a* is in the released state, the control proceeds from step S5 to step S4. When it is judged in step S5 that the lockup clutch 3*a* is in the engaged state, the control proceeds from step S5 to step S6.

In step S6, it is judged whether the fuel cut of the internal combustion engine 1 is in execution. When it is judged in step S6 that the fuel cut is not in execution, the control proceeds to step S4. When it is judged in step S6 that the fuel cut is in execution, the control proceeds to step S2.

Although the present invention has been described by way of the above specific example, the present invention is not limited to the above-described specific embodiment. Various changes and modifications of the above-described embodiment are possible within the range that does not depart from the scope of the present invention.

For example, it is feasible to stop the regenerative power generation of the alternator upon release of the lockup clutch, rather than stop the regenerative power generation of the alternator when the vehicle speed reaches the second vehicle speed value set according to the deceleration rate of the vehicle.

The above-described specific embodiment covers a control method of a vehicle and a control device of a vehicle.

The invention claimed is:

1. A control method of a vehicle, the vehicle including an internal combustion engine, an automatic transmission, a lockup clutch for rigid connection between the internal combustion engine and the automatic transmission, and an alternator provided as auxiliary equipment of the internal combustion engine and in constant driving connection to the internal combustion engine, the control method comprising:

performing a first operation mode of the vehicle in which, during deceleration running of the vehicle, the lockup clutch is engaged to establish rigid connection between the internal combustion engine and the automatic transmission, and the alternator is caused to execute regenerative power generation;

during the first operation mode, releasing the lockup clutch in response to a condition in which a speed of the vehicle reaches a first vehicle speed value that is set according to a deceleration rate of the vehicle, and during the first operation mode, stopping the regenerative power generation of the alternator in response to a condition in which the speed of the vehicle reaches a second vehicle speed value that is different from the first vehicle speed value to stop at a timing earlier than the release of the lockup clutch.

2. The control method of the vehicle according to claim 1, wherein the second vehicle speed value is set according to the deceleration rate of the vehicle.

3. The control method of the vehicle according to claim 2, wherein the first vehicle speed value or the second vehicle speed value is set higher as the deceleration rate of the vehicle becomes higher.

4. The control method of the vehicle according to claim 2, wherein the vehicle comprises an air conditioner having a compressor driven by the internal combustion engine, and wherein the first vehicle speed value or the second vehicle speed value is set higher as a refrigerant pressure of the air conditioner becomes higher.

5. The control method of the vehicle according to claim 1, wherein the first vehicle speed value or the second vehicle speed value in a brake-on state is set different from that in a brake-off state.

6. A control device of a vehicle, the vehicle including an internal combustion engine and an automatic transmission, a lockup clutch configured to provide a rigid connection between the internal combustion engine and the automatic transmission of the vehicle; and an alternator provided as auxiliary equipment of the internal combustion engine and configured to be in constant driving connection to the internal combustion engine, the control device comprising:

a controller configured to:

perform a first operation mode of the vehicle in which, during deceleration running of the vehicle, the lockup clutch is engaged to establish rigid connection between the internal combustion engine and the automatic transmission, and the alternator is caused to execute regenerative power generation;

during the first operation mode, cause release of the lockup clutch in response to a condition in which a speed of the vehicle reaches a first vehicle speed value during the deceleration running, wherein the first vehicle speed value is set according to a deceleration rate of the vehicle; and during the first operation mode, stop the regenerative power generation of the alternator in response to a condition in which the speed of the vehicle reaches a second vehicle speed value during the deceleration running to stop at a timing earlier than the release of the lockup clutch, wherein the second vehicle speed value is different from the first vehicle speed value.

7. A control method of a vehicle, the vehicle including an internal combustion engine, an automatic transmission, a lockup clutch for rigid connection between the internal combustion engine and the automatic transmission, and an alternator provided as auxiliary equipment of the internal combustion engine and in constant driving connection to the internal combustion engine, the control method comprising:

engaging the lockup clutch to connect the internal combustion engine and the automatic transmission;

executing regenerative power generation of the alternator;

releasing the lockup clutch in response to a condition in which a speed of the vehicle is lower than or equal to a first vehicle speed value that is set according to a deceleration rate of the vehicle; and stopping the regenerative power generation of the alternator in response to a condition in which the speed of the vehicle is lower than or equal to a second vehicle speed value that is different from the first vehicle speed value to stop at a timing earlier than the release of the lockup clutch, the second vehicle speed being set according to the deceleration rate of the vehicle.

* * * * *